March 20, 1956  R. H. COE  2,739,177
ISOMERIZATION OF HYDROCARBONS
Filed Oct. 29, 1953  2 Sheets-Sheet 1
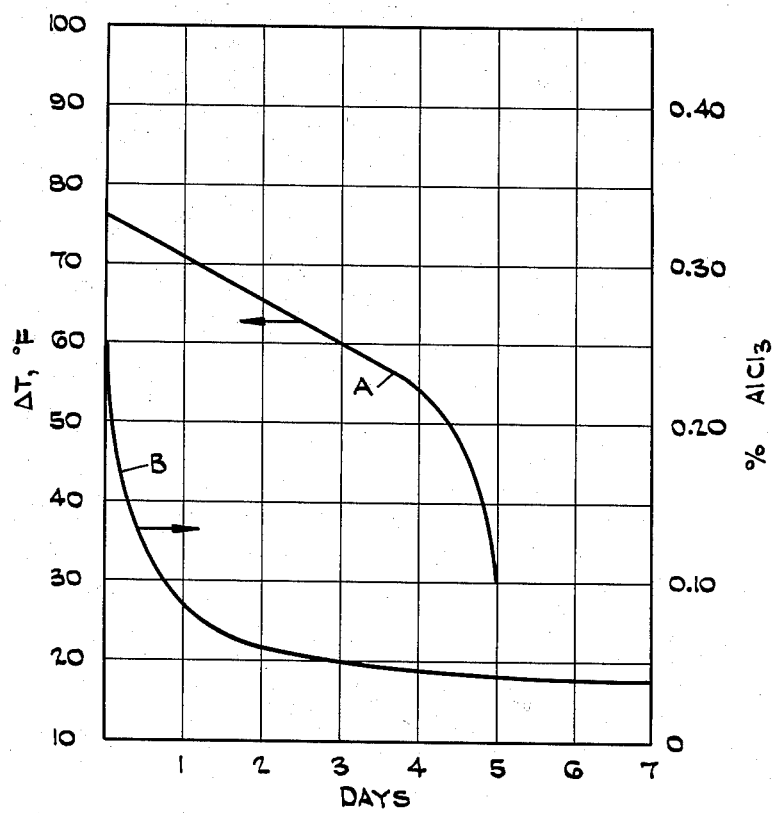
FIGURE I
Inventor:
Richard H. Coe
By James Todorovic
His Attorney

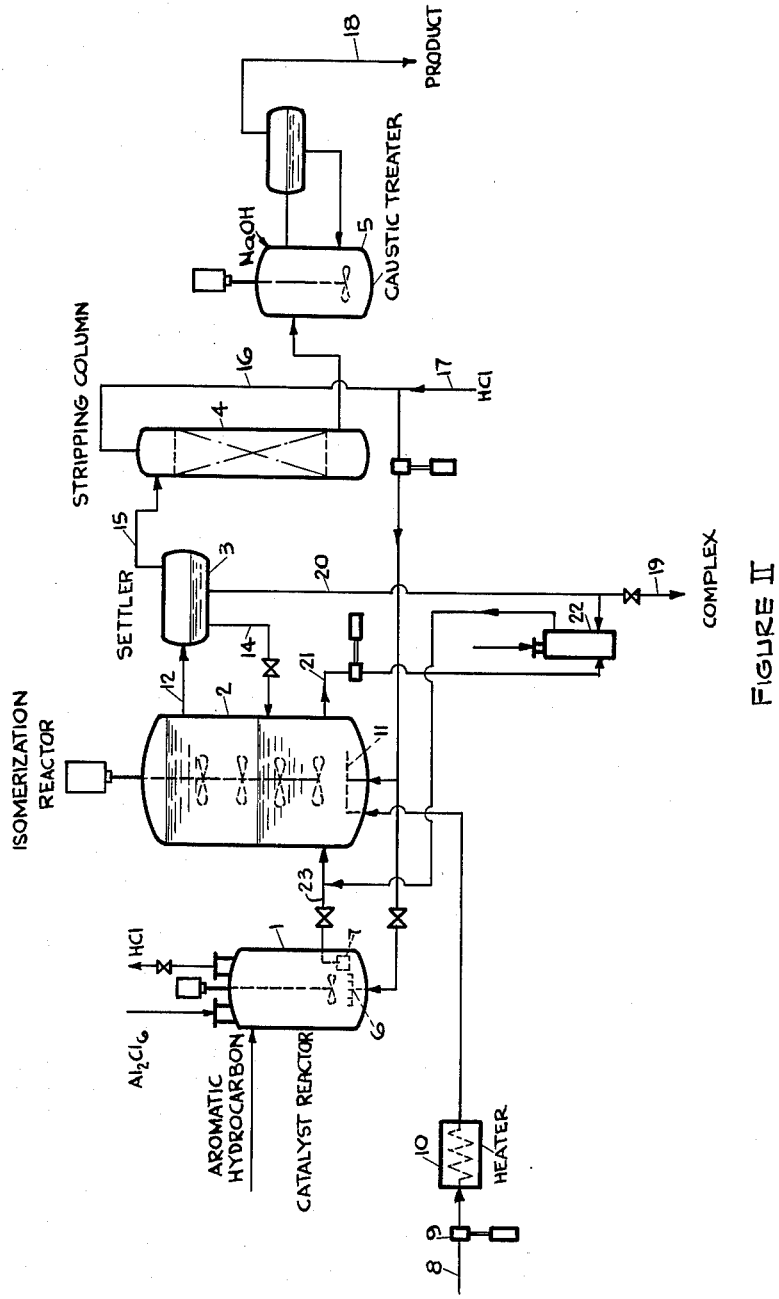
FIGURE II

United States Patent Office 2,739,177
Patented Mar. 20, 1956

2,739,177

ISOMERIZATION OF HYDROCARBONS

Richard H. Coe, Wilmington, Calif., assignor to Shell Development Company, Emeryville, Calif., a corporation of Delaware Application October 29, 1953, Serial No. 389,038

4 Claims. (Cl. 260—683.5)

This invention relates to the isomerization of hydrocarbons in the liquid phase with Gustavson complex catalyst.

An object of the invention is to provide a method of operation whereby the isomerization may be effectively carried out with decreased catalyst requirements.

It is known to isomerize hydrocarbons with aluminum chloride as catalyst. Aluminum chloride is an active isomerization catalyst but it has the disadvantage of also having a considerable cracking tendency. Consequently, when isomerizing hydrocarbons, and particularly the hydrocarbons of higher molecular weight, with this catalyst, appreciable amounts of cracking occur with concomitant conversion of the aluminum chloride to an inactive and bothersome sludge or tar. In order to overcome this difficulty, it is the practice to use a Gustavson complex catalyst. The Gustavson type complexes are active isomerization catalysts but have a lesser tendency to catalyze the undesired side reactions such as cracking. For this reason, the Gustavson complexes are preferred catalysts for the isomerization of paraffin hydrocarbons above butane and, especially for the isomerization of naphthenic hydrocarbons.

The Gustavson complex catalyst is prepared by reacting aluminum chloride with an aromatic hydrocarbon, e. g., benzene or toluene, with the aid of hydrogen chloride as catalyst. The usual method of preparing Gustavson complex is to place the aromatic hydrocarbon, e. g., toluene, in a mixing vessel, add aluminum chloride, and then stir the mixture for an extended period of time at a moderately elevated temperature while bubbling hydrogen chloride through the mixture. The reaction to form the complex takes place slowly. When no further reaction takes place, the resulting dark colored liquid complex is decanted from any unreacted aluminum chloride.

In effecting the isomerization with the Gustavson complex catalyst the usual method is to place a charge of the liquid complex in a reactor provided with means for efficient agitation. The liquid hydrocarbon to be isomerized is continuously charged to the reactor along with a small amount of hydrogen chloride promoter and is intimately contacted therein with the separate and more dense liquid complex phase. The temperature in the reactor is generally between about 150° F. and about 250° F. and is maintained substantially constant. Liquid hydrocarbon product continuously withdrawn from the reactor is passed to a settling drum wherein any entrained liquid complex is allowed to settle. The separated liquid complex may be returned to the reactor. The hydrocarbon withdrawn from the settling drum is passed to a stripping column operated to remove dissolved hydrogen chloride. The liquid product is then washed with caustic and passed to storage.

In this type of isomerization process, the cost of the catalyst is one of the important items of expense. It is, therefore, important to retain the cost of the catalyst as low as possible.

In cases such as this, the most efficient utilization of the catalyst is generally obtained by taking a charge of fresh catalyst, using it until it is spent, and then discarding it. This is, therefore, the usual practice. During the operation, it is found that the activity of the catalyst declines in a gradual manner up to a point and then declines rather sharply. Figure I of the attached drawing is a graph in which curve A illustrates the trend of activity vs. time of a given batch of catalyst. The activity, in this case, is indicated in terms of a differential temperature on the left hand ordinate scale. Thus, the isomerization reaction is exothermic; on the other hand, a constant reaction temperature is maintained at a desired value, e. g., 175° F. by controlling the preheat temperature of the hydrocarbon feed. The difference between the temperature of the preheated reactant feed entering the reaction zone and the temperature of the reaction mixture is a measure of the amount of reaction taking place and hence of the activity of the catalyst. It is the difference between these two temperatures that is used to indicate the activity of the catalyst in the left hand ordinate scale in the graph of Figure I. In the particular case in question, the differential temperatures relate to the isomerization of a $C_6$ fraction of a naphthenic, straight-run gasoline from a California petroleum using a Gustavson complex prepared from toluene. It will be noted that the activity of the catalyst is initially high and gradually declines until the differential temperature is about 50° F. and then declines at a relatively rapid rate. When the catalyst is spent it is discarded. In this operation, it will be noted that only spent catalyst is withdrawn fom the system while the average conversion is at a high value corresponding to a differential temperature of about 65° F.

An alternative mode of operation may be considered. Thus, a high activity can be maintained by continuously withdrawing a certain amount of the Gustavson complex from the reaction vessel and replacing it with fresh complex. It is evident, however, that this method of operation would not be expected to afford maximum utilization of the catalyst since the catalyst withdrawn from the system is not spent catalyst but active catalyst having the same activity as the bulk of the catalyst in use. As expected, the catalyst requirements are increased by this method.

It has now been found, however, that contrary to expectation and contrary to previous experience, the catalyst requirements can be approximately halved by operating in this last described manner, provided that a narrow intermediate activity level is maintained.

As pointed out above, the hydrocarbon product withdrawn from the reaction vessel is passed to a settling zone wherein any suspended droplets of the complex are allowed to settle and the recovered complex is returned to the reaction zone. Liquid hydrocarbon withdrawn from the settling zone is clear. This hydrocarbon product, however, still contains a small amount of aluminum chloride in solution, and it is primarily to remove this aluminum chloride that the mentioned caustic wash is employed. The concentration of this dissolved aluminum chloride is small, and it has heretofore been supposed that it represented a fixed quantity corresponding to the maximum solubility of aluminum chloride or aluminum chloride complex in the hydrocarbon under the prevailing temperature conditions, supplemented perhaps by traces of Gustavson complex which escaped separation in the settling zone. It is found, however, that this is not the case. It is found that after removal of suspended material, the concentration of aluminum chloride (whether as such or present in the form of a soluble complex) varies over the range of from about 0.25% to about 0.04%, or by a factor of about 7, depending upon the condition of the Gustavson complex. Thus, if a charge of fresh Gustavson complex is employed and the hydrocarbon product is carefully analyzed to determine the concentration of aluminum chloride, it is found that the concentration declines with the time of use substantially as illustrated by curve B in Figure I. Curve B is a graph wherein the concentration of aluminum chloride, shown on the right hand ordinate scale, is plotted against the time shown on the abscissa. While these concentrations are small based on the hydrocarbon product, they represent significant amounts of aluminum chloride based on the Gustavson complex. Comparing the shapes of the curves A and B, it is seen that they are opposite in character. Thus, if there is any relationship between the activity of the Gustavson complex and the amount of aluminum chloride in the product, it is not a direct relationship.

Referring to curve B; it will be evident that the loss of aluminum chloride from the fresh catalyst is of the order of 7 times the loss of aluminum chloride from the substantially spent complex. Thus, if it is attempted to retain a relatively fresh catalyst by a suitable catalyst replacement rate, the rate of loss of aluminum chloride from the complex, and hence the rate of depletion of potential catalyst, is high. On the other hand, referring to the curves, it is seen that under a limited set of conditions where the concentration of aluminum chloride in the product is low, the complex still retains a quite satisfactory activity. The mentioned substantial decrease in the catalyst requirements is obtainable when retaining the catalyst in this latter condition. This is done by controlling the rate of replenishment of the complex catalyst to maintain a substantially constant intermediate level of activity. This control cannot be effected solely on the basis of the dissolved aluminum chloride in the effluent product since, as will be evident from curve B, there is no appreciable change in this concentration when passing from an active complex to an inactive one. There is, however, a substantial change in passing from a relatively fresh complex to a used complex of intermediate activity. A suitable control to obtain the desired object can, however, be effected by regulating the rate of catalyst replenishment to maintain a substantially constant intermediate differential temperature. The temperature differential chosen is one in the range between about 50° F. and 70° F where the concentration of aluminum chloride in the effluent product is below about 0.08% by weight.

The substantial improvement obtainable through the described method of operation is clearly shown by the data in the following table wherein there are given the catalyst requirements in a trial operation according to the invention with semi-continuous catalyst replenishment, and the catalyst requirements when operating in the conventional method wherein single charges of the complex catalyst are prepared and are used until exhausted.

| | Bbls. Feed Treated | Chemicals Usage, Lb./Bbl. Feed | | |
|---|---|---|---|---|
| | | $Al_2Cl_6$ | HCl | Toluene |
| Conventional Operation | 373,906 | 0.656 | 0.097 | 0.413 |
| Improved Operation | 438,196 | 0.330 | 0.038 | 0.208 |

Figure II of the accompanying drawing is a flow diagram of an isomerization plant wherein the process of the invention may be carried out. The process will be further described in connection with this figure. Referring to Figure II, the plant comprises a reactor 1 for the preparation of the Gustavson complex catalyst, an isomerization reactor 2, a settling drum 3, a stripping column 4, and a caustic treater 5.

Gustavson complex catalyst is prepared by charging an aromatic hydrocarbon such as toluene or paracymene and anhydrous aluminum chloride to reactor 1 and stirring for approximately 36 hours while passing a small stream of hydrogen chloride through the distributor pipe 6. The amount of aluminum chloride may be, for example, 100 pounds for each 63 pounds of aromatic hydrocarbon. The mixture may be warmed by heating coils (not shown). The resulting liquid Gustavson complex is withdrawn through a screen 7 and passed by line 23 (by gas pressure) to the isomerization reactor.

The hydrocarbon to be isomerized, e. g., a straight-run gasoline fraction entering by line 8, is pumped by pump 9 through the coil of the preheater 10 and thence to the reactor 2. The liquid hydrocarbon and heavier liquid Gustavson complex are intimately contacted by agitation in reactor 2. A small stream of anhydrous hydrogen chloride (e. g., 0.02% based on the hydrocarbon) is passed into the reactor by distributor line 11. The temperature in the reactor 2 is maintained constant at a chosen temperature between about 150° F. and about 200° F., e. g., 180° F., by controlling the temperature of the preheated hydrocarbon feed.

Liquid hydrocarbon product carrying a small amount of Gustavson complex in suspension is withdrawn from the reactor 2 by line 12 to a settler 3. The separated Gustavson complex, or part of it, may be returned to the reactor by line 14. The clear hydrocarbon product containing dissolved hydrogen chloride is passed by line 15 to the stripping column 4 which is operated to strip out the dissolved hydrogen chloride and remove it in the overhead stream. This overhead hydrogen chloride is removed by line 16 and recycled. Additional makeup hydrogen chloride is supplied by line 17 as required. The bottom hydrocarbon product from the stripper 4 is passed through a caustic treater 5 and then withdrawn from the system by line 18.

As pointed out, with no catalyst replenishment the activity of the complex declines slowly over a period of days, whereas the concentration of aluminum chloride in the hydrocarbon product passing to the caustic treater declines relatively fast at first and then more slowly. The decline in the activity of the Gustavson complex is accompanied by a lesser exothermic heat effect. When the exothermic heat effect drops to below about 50° F., the catalyst is substantially exhausted and the conversion falls off rapidly. In the process according to my invention, the catalyst is not allowed to decline to this point but is maintained sufficiently active to afford an exothermic heat effect between 50° F. and 70° F. by the continuous or intermittent addition of fresh Gustavson complex. Excess complex is withdrawn by line 19. On the other hand, if it is attempted to retain a high activity by such replenishment, the concentration of aluminum chloride in the hydrocarbon product rapidly increases, thereby causing high catalyst consumption. The amount of fresh Gustavson complex, supplied for replenishment is, therefore, limited such that the concentration of aluminum chloride in the hydrocarbon product entering the caustic treater is below about 0.08% by weight. This then defines an operating region of intermediate activity where the desired low catalyst requirements may be realized.

Instead of adding freshly prepared Gustavson complex from reactor 1 for replenishment, it is found that even more favorable results may be obtained by reactivating a part of the withdrawn Gustavson complex by treating it with aluminum chloride. Thus, Gustavson complex withdrawn from any suitable point, e. g., from the settler 3 by line 20, and/or from the reactor by line 21, may be passed at a controlled rate through a bed of aluminum chloride granules in a vessel 22 and returned to the reactor.

The nature of the Gustavson complexes as catalytic agents and how they function in isomerization are only incompletely understood. Consideration of this matter and review of the literature, however, has led to some ideas which are presented solely as a possible aid in understanding how the described mode of operation may be effective for accomplishing the desired object. Firstly, it is likely that aluminum chloride per se is not the active catalyst in this process. The active catalyst is thought to be a trace of partially hydrolyzed aluminum chloride produced by minute traces of moisture in the system, although the degree of hydrolysis required to obtain an active catalyst is not known. The active catalyst appears to be deactivated by recombination of the partially hydrolyzed aluminum chloride into a relatively stable complex. The mechanism whereby the original Gustavson complex, containing anhydrous aluminum chloride, decomposes to give active catalyst apparently involves dissociation of the complex followed by the above-mentioned hydrolysis in the hydrocarbon phase of the freed aluminum chloride. The possibility, however, of direct reaction of the anhydrous complex with water to give the active catalyst cannot be completely ruled out. Nevertheless, it appears that the Gustavson complex acts as a reserve of potential catalyst. Both the original Gustavson complex and the catalytically inactive complex produced as described are capable of holding free aluminum chloride in solution. This dissolved free aluminum chloride, as well as that combined in the original complex, is potentially available to produce the required trace of active partially hydrolyzed aluminum chloride, and it can be removed from the catalyst phase via solution in the hydrocarbon. The concentration of aluminum chloride in the hydrocarbon product is, therefore, a function of the concentration of aluminum chloride dissolved in the catalyst phase. Although operation with a high concentration of dissolved aluminum chloride results in an increase in catalyst activity, such an operation is undesirable in view of the large loss of aluminum chloride which results through solution in the hydrocarbon product. If the concentration of dissolved aluminum chloride is held quite low, the catalyst consumption is considerably decreased through reduction in the solubility of aluminum chloride in the hydrocarbon product, while the catalytic activity is still retained at an acceptable level.

The differences in temperature between the preheated feed entering the reactor and the temperature within the reactor specified above and in the appended claims are those observed when using a relatively large and insulated reactor vessel where the loss of heat by radiation and conduction is small. It will of course be understood that when using a reactor having a high heat loss, the noted rise in temperature due to the reaction may appear to be less than indicated above for a given reaction rate. In such cases the noted temperature difference should be corrected for the heat loss. Thus, the temperature differences of 50 to 70° F. correspond to reaction rate constants of about 3 and 8 per hour at 180° F. The reaction rate constant is defined as follows:

$$K = \frac{1}{\text{Reaction time}} \times \frac{CH_p - CH_f}{CH_e - CH_p}$$

where CH is the mole percent cyclohexane and the subscripts $p$, $f$, and $e$ refer to the product, feed, and equilibrium, respectively.

I claim as my invention:

1. In the continuous isomerization of a hydrocarbon in the liquid phase with an immiscible liquid aluminum chloride complex catalyst, the improvement which comprises contacting the said hydrocarbon and catalyst in a reaction zone, maintaining the temperature in said reaction zone constant at a value between about 150° F. and 250° F. by controlling the temperature of preheated hydrocarbon feed to be isomerized and replenishing the liquid aluminum chloride complex catalyst in said reaction zone at such a rate that the temperature difference between the said reaction temperature and the feed preheat temperature is maintained between 50° F. and 70° F.

2. Process according to claim 1 further characterized in that the aluminum chloride complex catalyst is continuously replenished by cycling a stream thereof through a separate bed of solid aluminum chloride, the quantity of said cycled stream being limited as specified in claim 1 to maintain the said temperature difference between the stated limits.

3. In the continuous isomerization of a hydrocarbon in the liquid phase with a liquid aluminum chloride-aromatic hydrocarbon complex catalyst, the improvement which comprises maintaining a quantity of liquid aluminum chloride complex catalyst in a reaction zone, continuously passing a preheated stream of liquid hydrocarbon to be isomerized through said reaction zone and contacting it therein with said liquid catalyst, maintaining the temperature in said reaction zone constant at a value between 150° F. and 250° F. by controlling the temperature of said preheated stream of hydrocarbon to be isomerized, continuously withdrawing liquid aluminum chloride complex catalyst from said reaction zone, passing the withdrawn aluminum chloride complex catalyst through a bed of solid aluminum chloride and then passing it back to said reaction zone, and controlling the amount of liquid aluminum chloride complex thus recycled such that the preheat temperature of said hydrocarbon to be isomerized is at least 50° F. below the said reaction temperature but not in excess of 70° F. below the said reaction temperature, whereby the content of aluminum chloride dissolved in the isomerized hydrocarbon product from said reaction zone is retained below about 0.08% weight.

4. In the continuous isomerization of hydrocarbon in the liquid phase with an immiscible liquid aluminum chloride-aromatic hydrocarbon complex catalyst, the combination of process steps comprising continuously circulating a liquid aluminum chloride-aromatic hydrocarbon complex catalyst through a reaction zone maintained at a reaction temperature between 150° F. and 250° F., through a separate bed of solid aluminum chloride whereby aluminum chloride is dissolved in said liquid complex catalyst, and back to said reaction zone, continuously passing preheated hydrocarbon to be isomerized through said reaction zone and contacting it therein with said immiscible liquid aluminum chloride-aromatic hydrocarbon complex catalyst containing dissolved aluminum chloride, the rate of the specified circulation of aluminum chloride complex catalyst being limited such that the temperature rise due to the exothermic heat of the isomerization reaction is between 50° F. and 70° F.

References Cited in the file of this patent

UNITED STATES PATENTS 2,468,746   Greensfelder et al. _____ May 3, 1949
2,562,926   Legatski _____ Aug. 7, 1951

OTHER REFERENCES

"Anhydrous Aluminum Chloride in Organic Chemistry," by Thomas, Reinhold Publ. Corp., New York, N. Y. (1941), page 871 relied on.